April 10, 1928.

J. F. CRABILL 1,665,404

CORN SHUCKING MACHINE

Filed June 13, 1924

John F. Crabill, Inventor

By Adam E. Fisher, Attorney

Patented Apr. 10, 1928.

1,665,404

UNITED STATES PATENT OFFICE.

JOHN F. CRABILL, OF LA HARPE, ILLINOIS.

CORN-SHUCKING MACHINE.

Application filed June 13, 1924. Serial No. 719,731.

This invention relates to a corn shucking machine, and its primary object is to provide a simple, efficient and practical machine that will strip and shuck two rows of corn at the same time.

Another object is to provide a machine that will effectively disentangle and raise the broken corn stalks.

A further object is to provide a machine having a means incorporated therein, whereby the corn which is shelled while removing the shucks, is saved.

These and other objects will be apparent from the accompanying drawings and specification.

In the drawing

Figure 1:
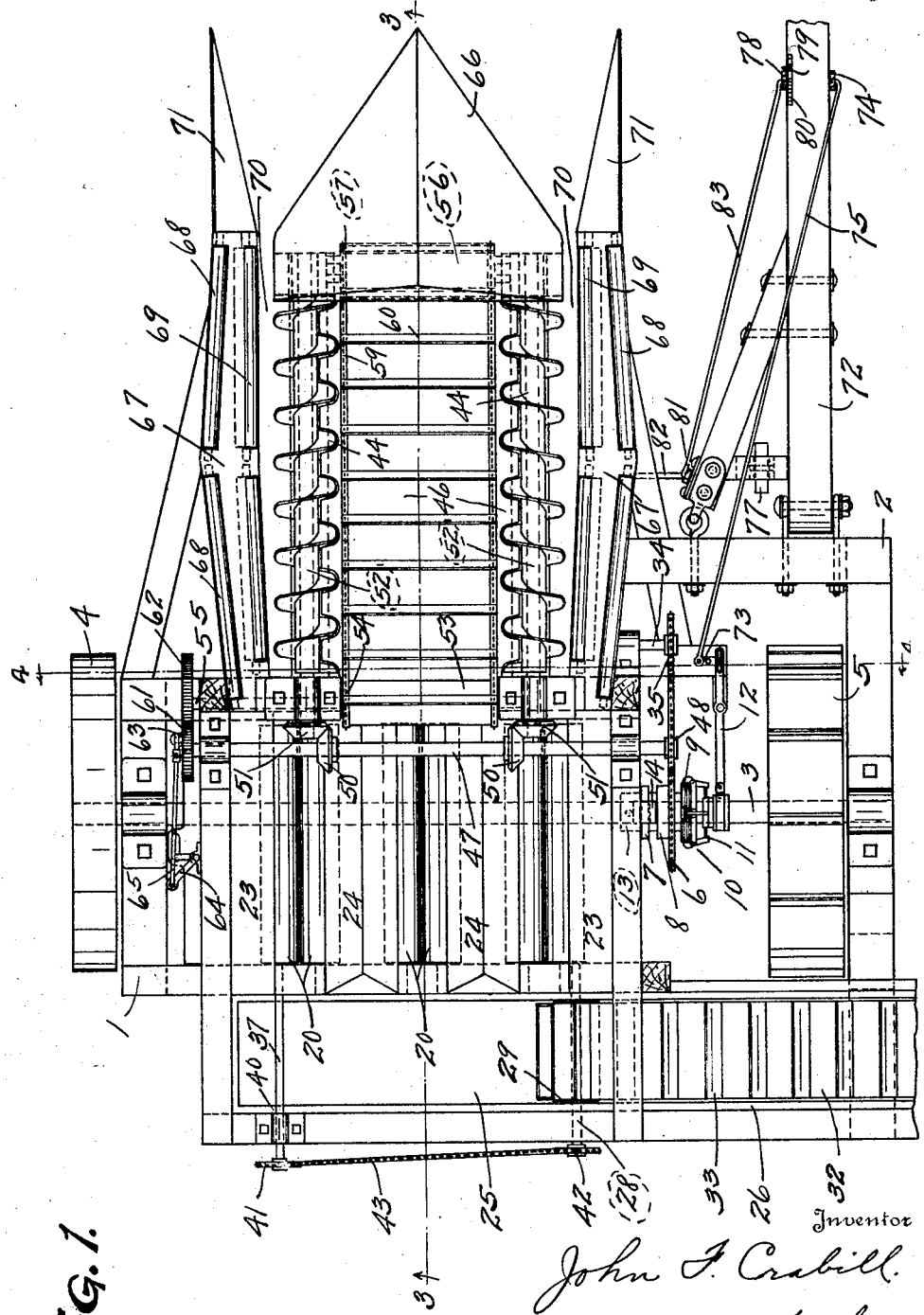
Figure 1 is a plan view.
Figure 2:
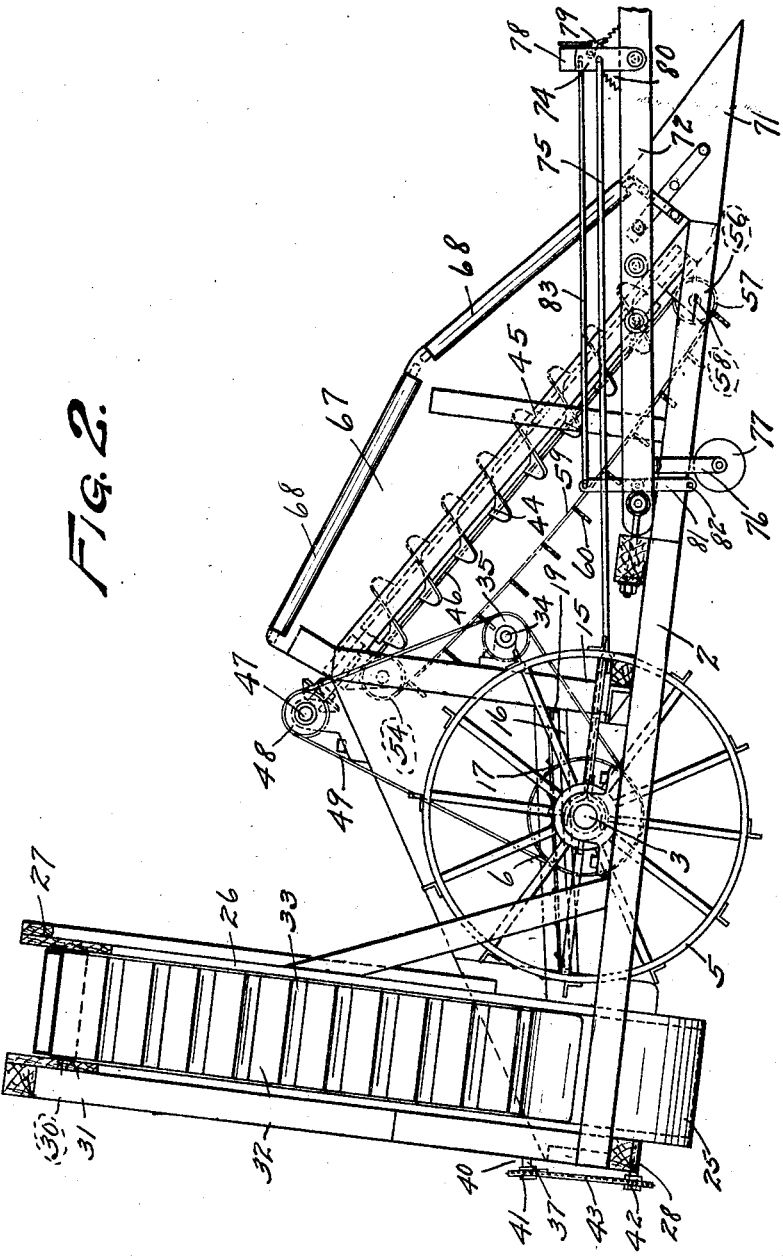
Figure 2 is a side elevation looking from the drive wheel side.
Figure 3:
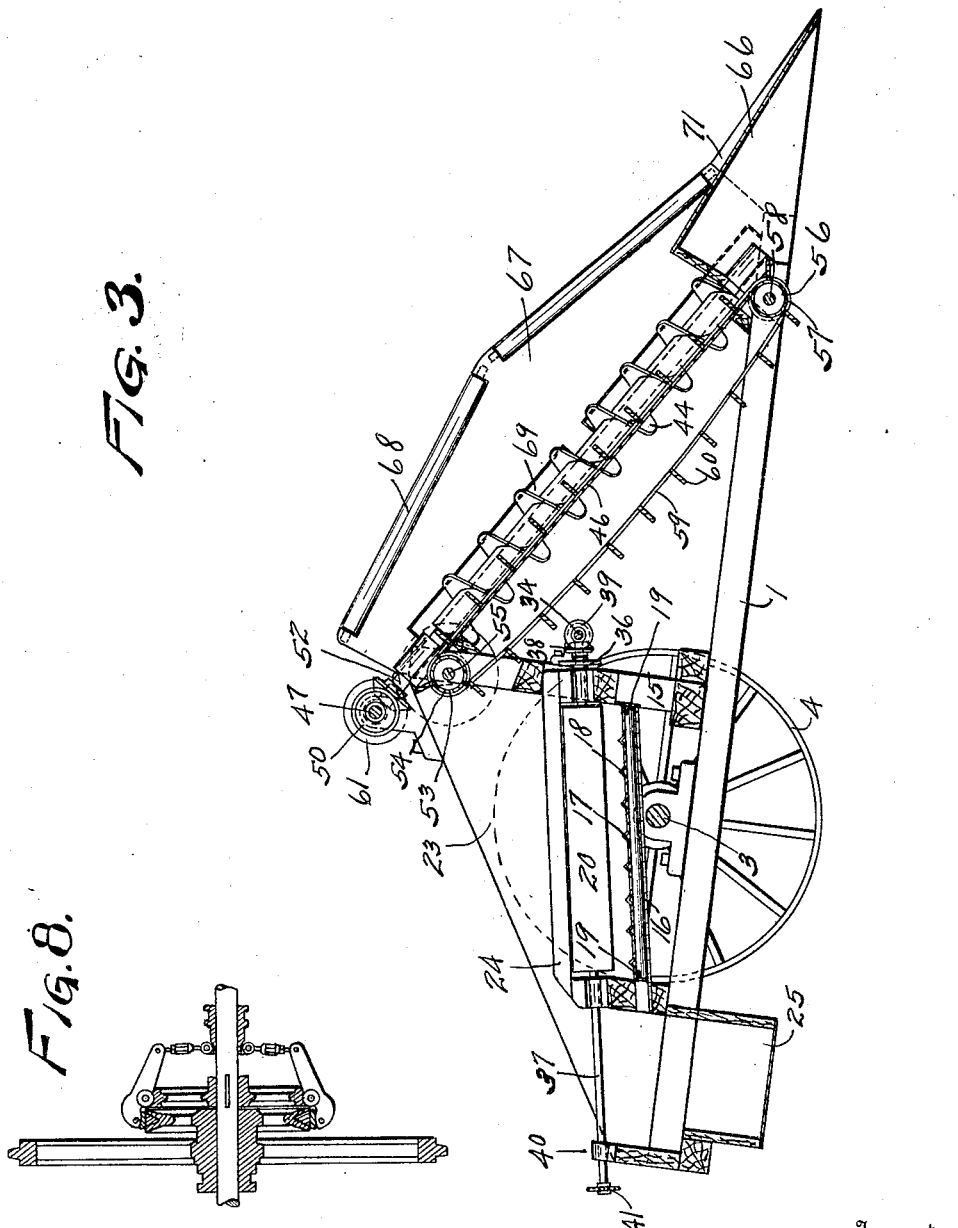
Figure 4:
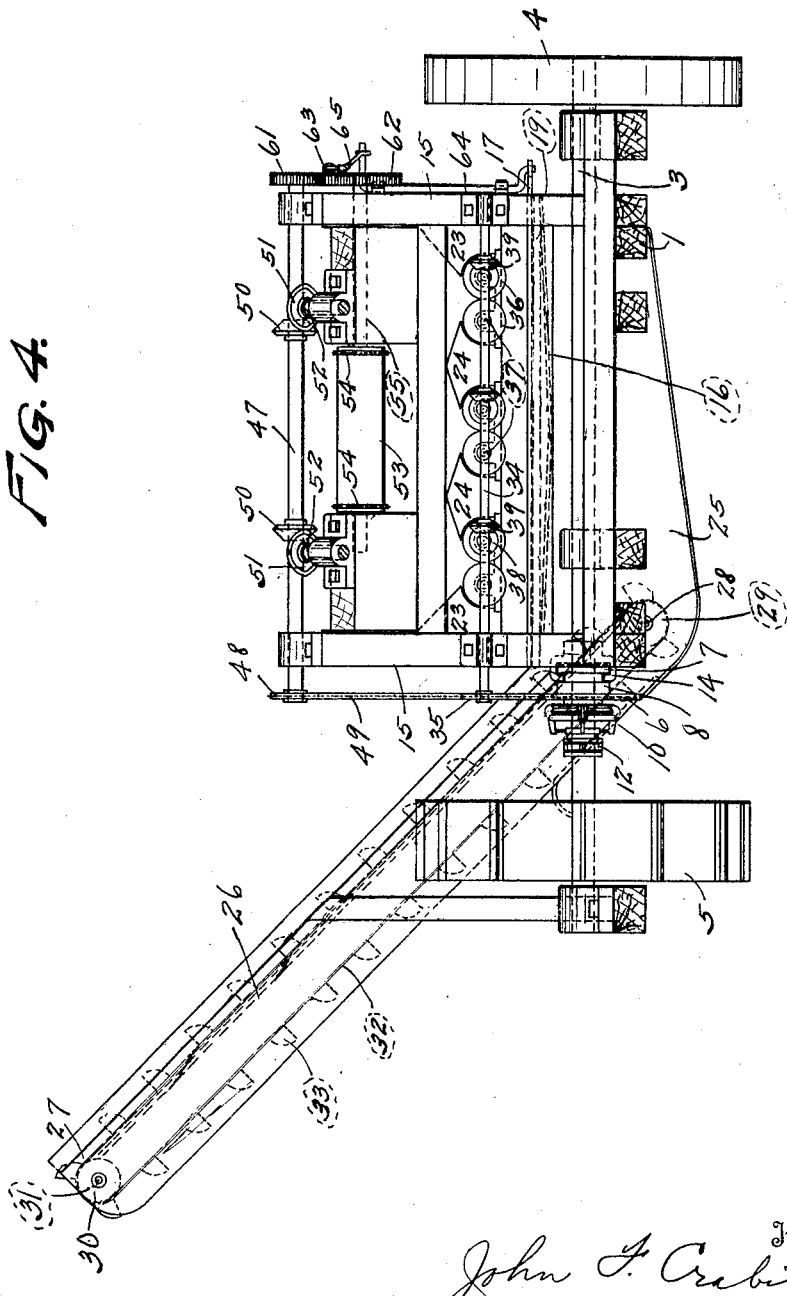
Figure 5:
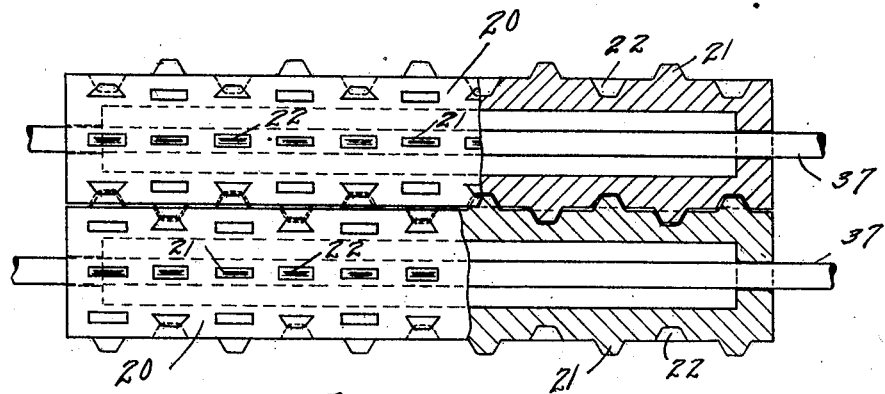
Figure 6:
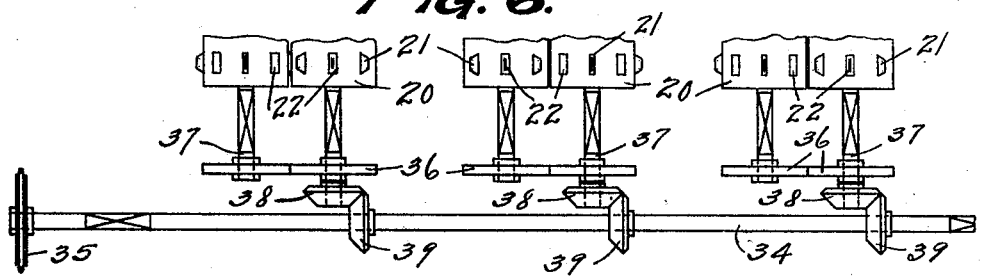
Figure 7:
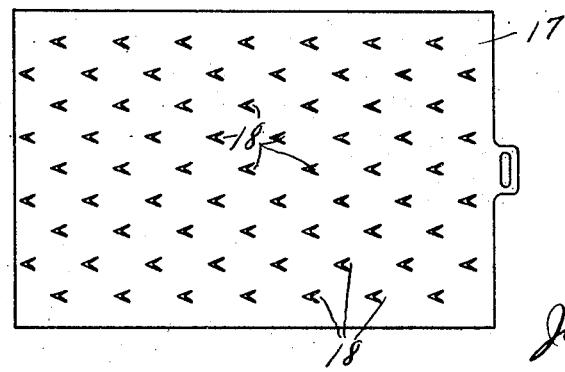

Figure 3 is a longitudinal vertical section taken on the line 3—3 of Figure 1;

Figure 4 is a transverse vertical section taken on the line 4—4 of Figure 1;

Figure 5 is a detail of the shucking rolls;
Figure 6 is a detail of the shucking roll drive;

Figure 7 is a detail of the perforated plate.

Figure 8 is an enlarged detail of the clutch mechanism.

In carrying out this invention I provide a primary frame 1 having a secondary frame 2 secured thereto. The said primary frame 1 is adapted to carry the elements of the invention while the said secondary frame 2 is provided with a suitable draft gear as by the draft tongue 72. A drive shaft 3 is horizontally journaled transversely across the primary frame 1 and the secondary frame 2. A drive wheel 4 and a bull drive wheel 5 are rigidly secured to the drive shaft 3. A sprocket wheel 6 having a collar 7 and the female half 9 of a friction clutch 10 incorporated in its hub 8 is loosely mounted upon the drive shaft 3 for a purpose to be later explained. The male half 11 of the friction clutch 10 is secured to the drive shaft 3 and is engaged by a shifting lever 12 which is pivotally secured to the secondary frame 2 to provide means for locking the said male half of the friction clutch 10 in the female half to permit rotating the said sprocket wheel 6. A split collar 13 having ears 14 incorporated therein is rigidly secured to the drive shaft 3. The said ears 14 are adapted to engage the collar 7 of the hub 8 in order to keep the said sprocket wheel 6 in alignment with the elements driven off said sprocket wheel 6. A roller frame 15 is secured to the primary frame 1 and has a sloping bottom 16 secured thereto in the rear half. A perforated plate 17 having V-shaped rises 18 formed therein, is slidingly mounted upon tracks 19, secured to the roller frame 15. Shucking rolls 20, having corresponding rises 21 and depressions 22 incorporated therein, are journaled in pairs, to the roller frame 15 above the perforated plate 17. Guide plates 23 are secured to the roller frame 15 in such a manner that the lower edges thereof are in line with the centers of the extreme shucking rolls 20. V-shaped guides 24 are mounted over the remaining shucking rolls 20 in such a manner that the edges of the said V-shaped guides 24 are in line with the centers of the said shucking rolls 20. An elevator shoe 25 is secured to the extreme end of the rear half of the roller frame 15. An elevator leg 26 having a head 27 incorporated therein, is secured to the elevator shoe 25 and the secondary frame 2. A shaft 28 is journaled in the elevator shoe 25 and has a pulley 29 rigidly secured thereto. A shaft 30 carrying a pulley 31 is journaled in the head 27. A belt 32 having buckets 33 secured thereto, engages the pulleys 29 and 31. A shucking roll drive shaft 34 is journaled to the roller frame 15. A sprocket wheel 35 is rigidly secured to the shucking roll drive shaft 34. Spur gears 36 are secured to the shucking roll shafts 37 and are adapted to mesh with each other in pairs corresponding to the pairs of shucking rolls 20. Beveled gears 38 are rigidly mounted upon one of the shafts 37 of each pair of shucking rolls 20 and mesh with beveled gears 39 rigidly mounted upon the shucking roll drive shaft 34. The extreme left shucking roll 20 has its shaft 37 extending over the elevator shoe 25 as shown at 40 and has a sprocket wheel 41 rigidly secured thereto. A sprocket wheel 42 is rigidly secured to the shaft 28 journaled in the elevator shoe 25. A sprocket chain 43 transmits power from the extreme left shucking roll 20 through the shaft 37 and sprocket wheel 41 to the sprocket wheel 42 mounted upon the shaft 28 journaled in the elevator shoe 25. Spiral snapping rolls 44 are journaled to the forward half 45 of the roller frame 15. A bottom 46 is secured to the forward half 45 of the roller frame 15 beneath the spiral snapping rolls 44. A snapping roll drive shaft 47 is journaled to the roller frame 15. A sprocket wheel 48 is rigidly secured to the snapping roll drive shaft 47. A sprocket chain 49 transmits power from the sprocket wheel 6 mounted upon the drive shaft 3, to the sprocket wheel 35 mounted upon the shucking roll drive shaft 34 and the sprocket wheel 48 mounted upon the snapping roll drive shaft 47. Beveled gears 50 are mounted upon the snapping roll drive shaft 47 and mesh with beveled gears 51 mounted upon the spiral snapping roll shafts 52. A drum 53 having sprocket wheels 54 incorporated therein is rigidly secured to a shaft 55 journaled to the roller frame 15 beneath the snapping roll drive shaft 47. A drum 56 having sprocket wheels 57 incorporated therein, is mounted upon a shaft 58 journaled to the roller frame 15 at the lower extremities of the spiral snapping rolls 44. Sprocket chains 59 having fins 60 secured thereto, engage the sprocket wheels 54 incorporated in the drum 53 and the sprocket wheels 57 incorporated in the drum 56. The sprocket chains 59 slide along the bottom 46 and act as a chain conveyor; the spiral snapping rolls 44 form the sides of the chain conveyor. A spur gear 61 is rigidly secured to the snapping roll drive shaft 47. A spur gear 62 which meshes with the spur gear 61 and has an arm 63 incorporated therein, is rigidly secured to the shaft 55 in line with the spur gear 61. An eccentric 64 which engages the perforated plate 17 is journaled to the roller frame 15. A connecting rod 65 is secured to the eccentric 64 and the arm 63 incorporated in the spur gear 62. A breaker 66 is secured to the forward end of the roller frame 15 above the journals of the spiral snapping rolls 44 and the drum 56. Guides 67 having rolls 68 and 69 journaled therein are secured to the roller frame 15 in alignment with the horizontally journaled spiral snapping rolls 44 and in such a manner that cornstalks can pass between the said guides 67 and the spiral snapping rolls 44 as shown at 70. Shoes 71 are releasably secured to the forward ends of the guides 67 for the purpose of guiding broken and fallen cornstalks to the said spiral snapping rolls 44. A draft tongue 72 is releasably secured to the secondary frame 2. A bar 73 which engages the shifting lever 12 is pivoted to the secondary frame 2. A lever 74 is secured to the draft tongue 72 and communicates with the bar 73 by means of a connecting rod 75. A frame 76 having a wheel 77 journaled therein, is secured to the draft tongue 72. A primary lever 78 having a dog 79 which engages a ratchet 80 secured thereto, is secured to the draft tongue 72. A secondary lever 81 having an arm 82 incorporated therein, is pivoted to the draft tongue 72 and is adapted to engage the primary frame 1. A connecting rod 83 is secured to the primary lever 78 and the secondary lever 81.

In operation, a team of horses or a tractor is hitched to the draft tongue 72 of the corn shucker. The shucker straddles two rows of corn; the stalks passing through the spaces 70. The spaces 70 are made just wide enough to permit a corn stalk to pass through. When passing through the spaces 70 the corn stalks are stripped of the ears of corn by the spiral snapping rolls 44 and deposited on the bottom 46 from where they are carried up and deposited on the shucking rolls 20 by the sprocket chains 59 and fins 60. When being deposited on the shucking rolls 20 the ears of corn are spread by the V-shaped guides 24. The shucking rolls 20 grip the shucks on the ears of corn and tear them off, leaving the ears of corn to slide down into the elevator shoe 25. The shucks as they are torn off the ears of corn, are deposited on the perforated plate 17 and carried outwardly by the gyrating motion of the said perforated plate 17 with the aid of the V-shaped rises 18 formed in the said perforated plate 17. The said shucks pass off the perforated plate 17 on the bull wheel 5 side and drop to the ground. The kernels of corn that shell off when the shucks are torn off, pass between the shucking rolls 20 to the perforated plate 17 and through the perforation onto the sloping bottom 16 thence into the elevator shoe 25 from where the ears and shelled corn are carried by the belt 32 and buckets 33 into the head 27, from where they drop into a wagon that is being drawn along side of the shucker. The perforated plate 17 receives its sliding motion from the eccentric 64 journaled to the roller frame 15. The breaker 66 and the shoes 71 are adapted to raise the broken corn stalks and guide them into the spaces 70. The loosely mounted rolls 68 of the guides 67 are provided to prevent the broken corn stalks that hang over the top sides of the said guides 67 from being stripped of the ears of corn, while the loosely mounted rollers 69 of the said guides 67 are provided to prevent the stripped corn stalks from catching in between the spiral snapping rolls 44, the roller frame 15 and the guides 67.

While I have herein described a certain specific method of constructing and assembling the elements of my invention, it is understood the same may be varied in minor details, without departing from the spirit of my invention as defined in the appended claim.

I claim:

In a corn harvesting machine embodying a wheel borne chassis and drafting means therefor, the combination of a spaced and parallel pair of upwardly and rearwardly inclined snapping rolls journaled in the chassis, a plurality of horizontally arranged pairs of husking rolls journaled in the chassis immediately back of and under the elevated rear ends of the said snapping rolls and in parallelism with the extended vertical planes passing down through the said snapping rolls, V-shaped corn guides mounted over the junctures of the several pairs of shucking rolls, a perforated shuck handling plate oscillatably mounted below the said husking rolls, a sloping kernel catching bottom arranged below the said shuck handling plate, an elevator shoe arranged transversely at the rear of the chassis and adapted to catch the ears of shucked corn from the husking rolls and the kernels from the sloping bottom, means for catching and elevating the ears of unhusked corn from the snapping rolls over onto the husking rolls, means for supporting the upper free ends of corn stalks with their ears of corn to the action of the machine, and means for driving the several working elements of the machine.

In testimony whereof I affix my signature.

JOHN F. CRABILL.